US011117759B2

(12) United States Patent
Elazary et al.

(10) Patent No.: US 11,117,759 B2
(45) Date of Patent: Sep. 14, 2021

(54) DEPALLETIZING ROBOTS FOR AN AUTONOMOUS WAREHOUSE

(71) Applicant: inVia Robotics, Inc., Westlake Village, CA (US)

(72) Inventors: Lior Elazary, Agoura Hills, CA (US); Randolph Charles Voorhies, Culver City, CA (US); Daniel Frank Parks, II, Los Angeles, CA (US)

(73) Assignee: inVia Robotics, Inc., Westlake Village, CA (US)

( * ) Notice: Subject to any disclaimer, the term of this patent is extended or adjusted under 35 U.S.C. 154(b) by 236 days.

(21) Appl. No.: 16/203,956

(22) Filed: Nov. 29, 2018

(65) Prior Publication Data

US 2020/0172352 A1 Jun. 4, 2020

(51) Int. Cl.
*B65G 61/00* (2006.01)
*B65G 59/02* (2006.01)

(52) U.S. Cl.
CPC ............. *B65G 61/00* (2013.01); *B65G 59/02* (2013.01)

(58) Field of Classification Search
CPC ................................ B65G 61/00; B65G 59/02
USPC ........................................................ 700/245
See application file for complete search history.

(56) References Cited

U.S. PATENT DOCUMENTS

| | | | | |
|---|---|---|---|---|
| 9,333,649 B1 * | 5/2016 | Bradski | ............. | G06K 9/00201 |
| 9,486,921 B1 * | 11/2016 | Straszheim | ............ | B25J 9/1679 |
| 10,011,439 B2 * | 7/2018 | Sonoura | ................ | B65G 15/00 |
| 10,022,867 B2 * | 7/2018 | Saboo | .................... | B25J 9/1674 |
| 10,346,797 B2 * | 7/2019 | Jacobus | ........... | G06K 19/07758 |
| 10,730,708 B2 * | 8/2020 | Otsuru | ................ | B25J 15/0616 |
| 2009/0112675 A1 * | 4/2009 | Servais | ............... | G06Q 10/087 |
| | | | | 705/7.25 |

* cited by examiner

*Primary Examiner* — Khoi H Tran
*Assistant Examiner* — Rodney P King
(74) *Attorney, Agent, or Firm* — Ansari Katiraei LLP; Arman Katiraei; Sadiq Ansari

(57) ABSTRACT

An automated robotic depalletizing system includes at least one robot for transferring inventory that arrives on a pallet to different storage locations within a warehouse. The robot may perform the automated depalletizing by moving to the pallet having a stacked arrangement of a plurality of objects, identifying, via a sensor, a topmost object of the plurality of objects, aligning a retriever with the topmost object, engaging the topmost object with the retriever, and transferring the topmost object from the pallet to the robot by actuating the retriever. The automated depalletizing may also be performed via coordinated operations of two or more robots. For instance, a first robot may retrieve objects from the pallet, and a second set of one or more robots may be used to transfer the retrieved objects into storage.

20 Claims, 14 Drawing Sheets

DEPALLETIZING ROBOTS FOR AN AUTONOMOUS WAREHOUSE

TECHNICAL FIELD

The present invention relates to the technical field of robotics.

BACKGROUND INFORMATION

Robots may be used to reduce costs in many industries and sectors by automating various manually performed tasks. Robots are especially effective at performing repeat mundane tasks.

Warehouse management and/or inventory management can greatly benefit from automation. Warehouse management and/or inventory management may include repeated tasks such as receiving and storing new inventory. Other repeated tasks may include order retrieval, fulfillment, and packaging. These are examples of some tasks that currently have high rates of manual or human execution.

Automating one or more of these tasks may require special purpose robots that have the functionality to perform the tasks, and that are also programmed to perform the tasks. Automation of these and other tasks may lead to lower error rates, higher throughout via continuous operation of the robots, and lower operating costs.

DETAILED DESCRIPTION OF PREFERRED EMBODIMENTS

The following detailed description refers to the accompanying drawings. The same reference numbers in different drawings may identify the same or similar elements.

Systems and/or methods, as described herein, automate various tasks performed in a warehouse. The tasks may be automated via a set of autonomous robots that include specialized functionalities and methods of operation for performing one or more tasks without human assistance or involvement. In some embodiments, the robots may automate depalletizing tasks for transferring inventory that arrive on pallets to different storage locations within a warehouse.

Depalletizing tasks are difficult to automate because of the different stacked arrangements for objects on different pallets. As such, robots cannot simply perform the same operations when depalletizing different pallets, and may be required to dynamically adjust their operations based on how the objects are stacked or arranged on different pallets, and also based on the different sizes and weights of the objects on the different pallets. For instance, a robot cannot simply retrieve the first object it finds in the pallet because doing so may cause other objects stacked atop the first object to fall over and/or be damaged. Similarly, a pallet may contain objects of different sizes and shapes. In such cases, the robot has to adjust its operation for retrieval of each different object to ensure that the object and/or neighboring objects are not damaged.

Accordingly, some embodiments provide one or more depalletizing robots that include specialized functionality (e.g., sensors, actuators, and/or other mechanical elements), and specialized methods of operation to safely retrieve objects of different sizes and weights from stacked arrangements of different heights, depths, and/or widths on different pallets without damaging the items or the arrangements. The depalletizing robots may also transfer the retrieved objects to different storage configurations (e.g., stored atop one another, arranged in rows, and/or placed on shelfs, racks, or other storage units) within the warehouse.

The depalletizing robots and resulting automation may provide various advantages over humans that manually perform the depalletizing tasks. For instance, the robots may reach objects on taller stacks or pallets that humans may be unable to access without a ladder or lift. The robots may also provide more careful handling of the objects, verify correct placement of the objects in storage, operate all hours of the day, and/or retrieve objects that may be too heavy or large for humans to safely retrieve. Other advantages of the robot-based automated depalletizing may include optimizing the storage of objects by dynamically selecting storage locations for the objects based on demand and/or inventory on hand.

Figure 1:
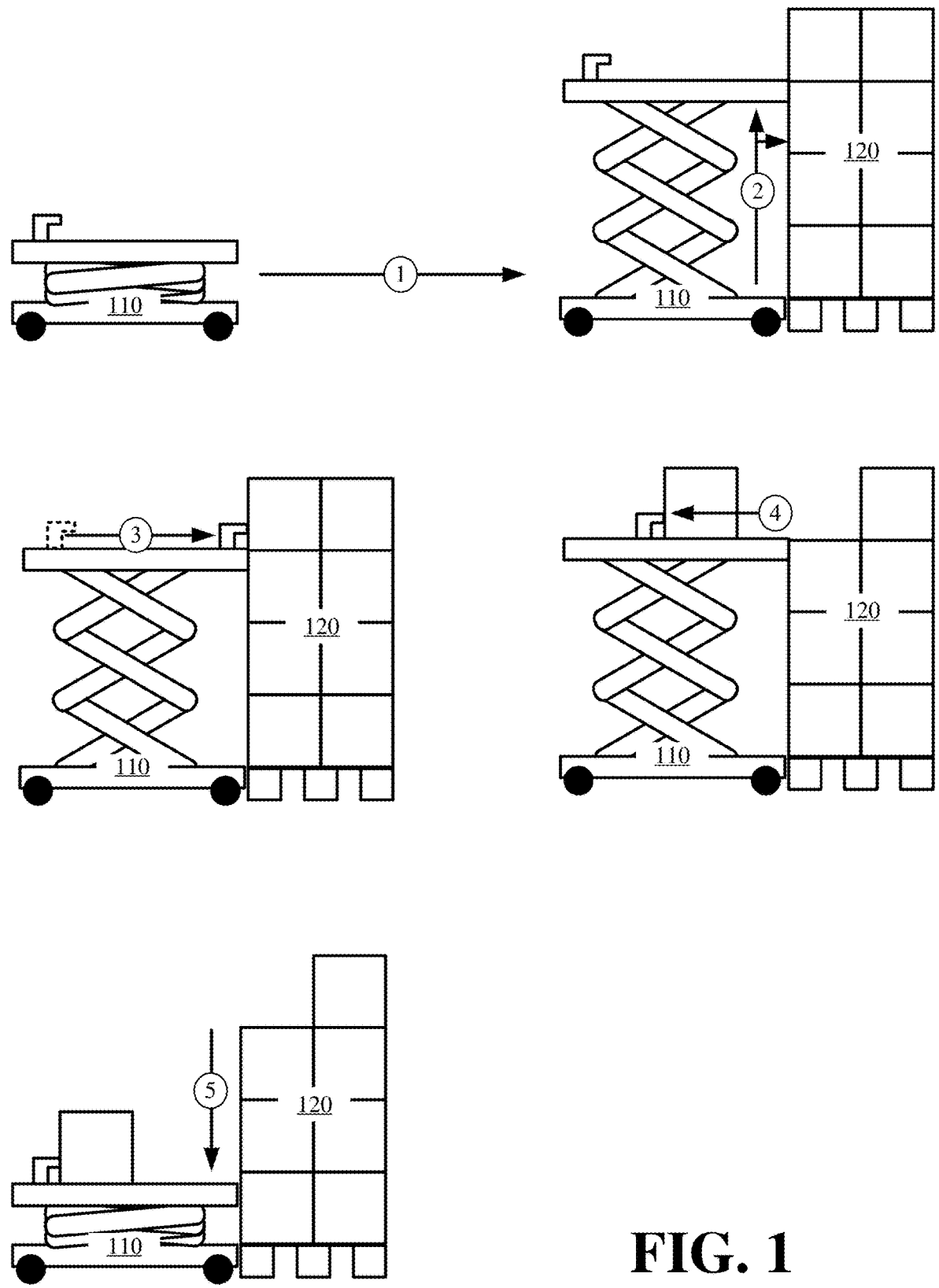
FIG. 1 illustrates an example of automated depalletizing in accordance with some embodiments described herein.

FIG. 1 illustrates an example of automated depalletizing in accordance with some embodiments described herein. FIG. 1 illustrate different interactions between depalletizing robot 110 and objects of pallet 120. In particular, disposed atop pallet 120 may be a stacked arrangement of objects that are to be relocated to one or more storage locations in a warehouse. Removing any object but the topmost object from pallet 120 may alter the stacked arrangement, and/or may cause one or more objects to fall and be damaged. Other issues may arise from improperly depalletizing the objects from pallet 120. For instance, an object being retrieved and/or other objects that are underneath the object being retrieved may be damaged when the retrieved object is improperly supported (e.g., weight, width, and/or other properties of the object are not supported) during retrieval. Also, pallet 120 is an example of one stacked arrangement of objects. Other pallets may include different sized or weighted objects that are stacked in different arrangements.

FIG. 1 illustrates depalletizing robot 110 using its specialized functionality and a specialized method of operation to safely retrieve objects from pallet 120 in order to automate the depalletizing task in a warehouse in accordance with some embodiments described herein. As shown in FIG. 1, robot 110 may move (at 1) to pallet 120. In some embodiments, robot 110 uses a scanner, camera, and/or other sensor to verify its positioning before a correct pallet (e.g., pallet 120).

Robot 110 may align (at 2) the positioning of its base and/or a platform that is atop an actuated lift with a position of a topmost object in the stacked arrangement on pallet 120. When multiple objects are at the same height on pallet 120, robot 110 may align the platform with the topmost object that is also closest or frontmost to robot 110.

The alignment (at 2) may involve at least two operations. A first alignment operation may involve robot 110 raising the lift to align a height of the platform with a height of the topmost object. Robot 110 may use various cameras and/or other sensors located about the platform to identify the topmost object, and to determine the height at which the topmost object rests atop other objects. A second alignment operation may involve robot 110 repositioning the platform to be horizontally aligned with a position of the topmost object. In some embodiments, robot 110 may use one or more sensors (e.g., a camera) about the platform to align left and right sides of the platform to left and right sides of the topmost object. In some embodiments, robot 110 may use the one or more sensors about the platform to align left and right sides of the platform with a center of the topmost object.

Aligning (at 2) the platform with the topmost object is performed for safe retrieval of the topmost object. In particular, the alignment (at 2) of the platform with the topmost object allows robot 110 to retrieve the topmost object while supporting the topmost object about its center and from below. This manner of retrieval may prevent the topmost object from being damaged by minimizing the possibility of the topmost object falling off to a side when retrieved, and/or underneath objects from being damaged because the platform of robot 110 is used to support the weight of the topmost object as it is being retrieved from pallet 120. Achieving the desired alignment therefore requires using specialized functionalities and programming of robot 110 that are described below.

Once alignment (at 2) is achieved, robot 110 may extend (at 3) a retriever to engage the topmost object. In some embodiments, the retriever may be moved across the platform by an actuator. The retriever may use one or more of a grasping, suction, and/or magnetic mechanism to engage the topmost object.

Robot 110 may then retract (at 4) the retriever that has engaged the topmost object. Retracting the retriever causes the topmost object to slide and/or lift off the stacked arrangement and onto the platform of robot 110.

Robot 110 may lower (at 5) the lift once the topmost object is safely on the platform. Lowering the lift that retains the weight of the topmost object may improve robot's 110 center of gravity, thereby allowing robot 110 to transfer the topmost object to a different location more quickly and safely.

In some embodiments, robot 110 may scan an identifier associated with the topmost object and/or pallet 120 after retrieving the topmost object from pallet 120. The scanned identifier may be wirelessly transmitted to an inventory management system and/or other robots to identify the extraction of the object from pallet 120, and to track the inventory as pallet 120 is depalletized.

In some embodiments, multiple robots 110 may perform the automated depalletizing that is illustrated in FIG. 1. In particular, a first robot may retrieve a topmost object from pallet 120, and may move away from pallet 120 in order to transfer the retrieved object to a storage location. A second robot may then arrive at pallet 120, and retrieve the next topmost object. In this manner, two or more robots 110 may coordinate their operations to automate and expedite the depalletizing that is illustrated in FIG. 1.

Figure 2A:
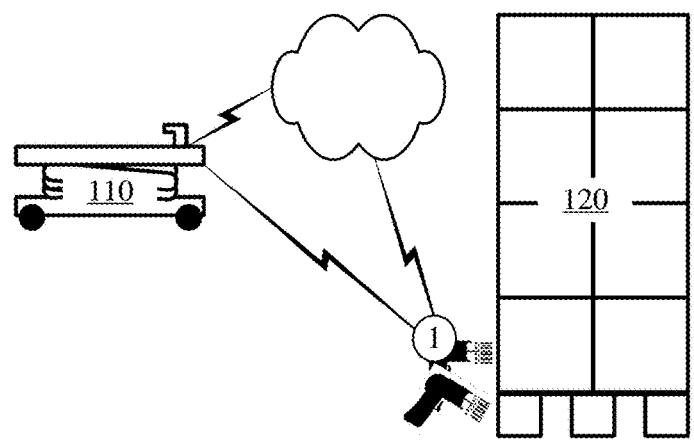
FIGS. 2A and 2B illustrate a specialized method of operation by which a robot performs automated depalletizing in accordance with some embodiments.
Figure 2A:
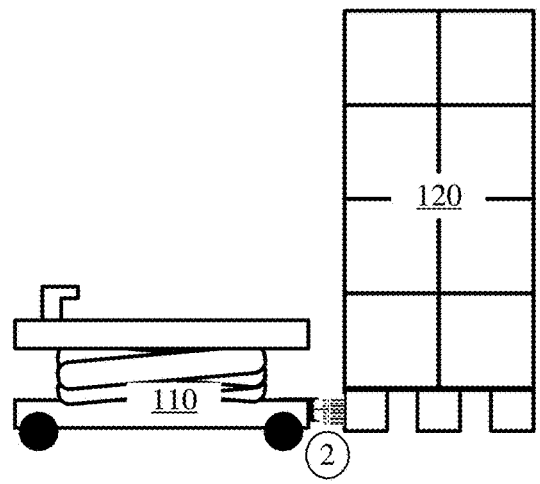
Figure 2B:
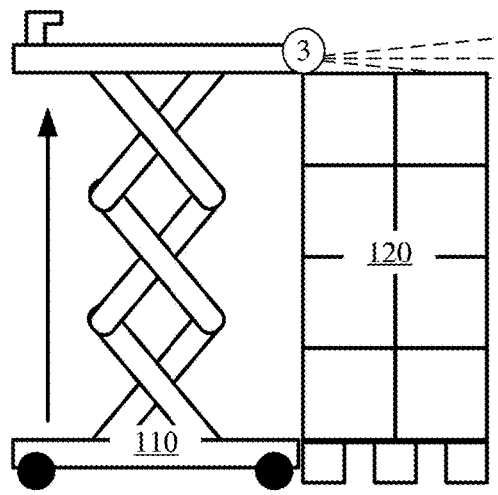
Figure 2B:
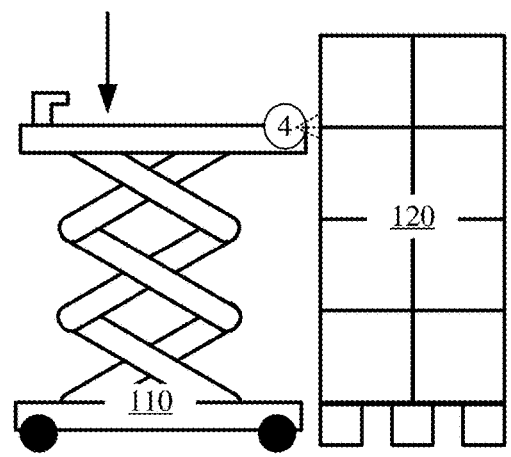
Figure 2B:
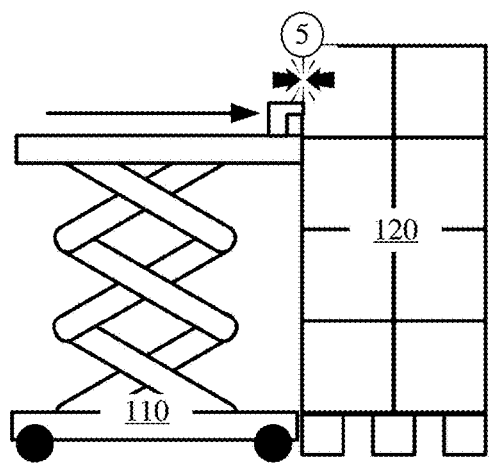

FIGS. 2A and 2B illustrate a specialized method of operation by which robot 110, using various onboard sensors, actuators, wireless radios, motors, and/or other mechanical elements, performs automated depalletizing in accordance with some embodiments. The automated depalletizing may be initiated in response to notifying robot 110 that pallet 120 is present in the warehouse with objects awaiting to be depalletized. For instance, FIG. 2A illustrates wirelessly providing (at 1) robot 110 with one or more identifiers. The one or more identifiers may include a first identifier for identifying a pallet with objects awaiting to be depalletized, and/or a second identifier for identifying a location of the pallet. The identifiers may be wirelessly transmitted over a WiFi, Long Term Evolution (LTE), and/or other networks that indirectly or directly communicate with robot 110. The identifiers may be numerical or alphanumerical values that can be encoded as barcode, Quick Response (QR) code, other fiducials, or other visual feature that is presented on pallet 120 or one or more objects on pallet 120.

Based on the provided (at 1) identifiers, robot 110 may identify a path to pallet 120, and may move to pallet 120 via the identified path. For instance, robot 110 may store a map of the warehouse, and may plot a path to the location associated with the second identifier based on the stored map. In some embodiments, a centralized robotic control system may receive the identifiers and provide the path to robot 110. The centralized robotic control system may track a position of robot 110 in the warehouse, may identify the location of pallet 120 based on the provided identifiers, and may generate a path for robot 110 to arrive before pallet 120.

After navigating to pallet 120, robot 110 may use an onboard scanner, camera, or other sensor to scan (at 2) an identifier of pallet 120, and confirm that robot 110 is before the correct pallet. The scanner or sensor may be located at the base of robot 110 or on the platform or retriever of robot 110. Robot 110 verifies it is at the correct pallet 120 based on the scanned (at 2) identifier from pallet 120 matching to the first identifier provided (at 1) to robot 110.

Robot 110 may commence the object extraction after successfully verifying it has arrived before pallet 120. To perform the object extraction, robot 110 may first identify a next object to retrieve from pallet 120. As noted above, selection of an incorrect object could result in damaging one or more of the objects, robot 110 being unable to retrieve the object, and/or modifying the stacked arrangement of objects on pallet 120 such that the retrievals of subsequent objects become more challenging.

As shown in FIG. 2B, robot 110 raises its lift until a sensor on the lift and/or platform atop the lift detects (at 3) the topmost object on pallet 120. In some embodiments, robot 110 detects (at 3) the topmost object by activating the sensor on the platform atop the lift. The sensor may identify objects of the pallet as the lift is raised, and may identify the topmost object once the lift moves the sensor above the topmost object and the sensor no longer detects objects of the pallet.

Robot 110 may lower the lift back down until the platform is aligned with the topmost object. In some embodiments, robot 110 may determine when the platform is aligned with the topmost object via the sensor on the platform. For instance, the sensor may detect (at 4) a gap or space between the topmost object and the underneath object, and robot 110 may align the platform height with the detected (at 4) gap. In some embodiments, the sensor may detect (at 4) the bottom of the topmost object and the top of the underneath object via feature matching or image processing. In some embodiments, the sensor may detect (at 4) the edges of the topmost object so that the robot 110 may align the platform height to the bottom of the topmost object based on the sensor output. In some embodiments, robot 110 may store and/or obtain a size of each object on the pallet. For instance, from scanning (at 2) pallet 120 identifier, robot 110 may submit the scanned identifier to an inventory management system that then provides robot 110 with the dimensions of the objects on pallet 120. Once the platform is raised above the topmost object, robot 110 may lower the platform by a height equal to one object on the platform.

Upon aligning the platform height to the bottom of the topmost object on pallet 120, robot 110 may activate the retriever on the platform to engage the topmost object. The retriever element may include a sensor to determine (at 5) when contact is made with the topmost object. The retriever may engage the topmost object upon contacting the topmost object. As noted above, the retriever may engage the topmost object using one or suction, magnet, or grasping mechanism. The retriever may retract to a backmost position on the platform, thereby ensuring that the topmost object is entirely on the platform.

Figure 3A:
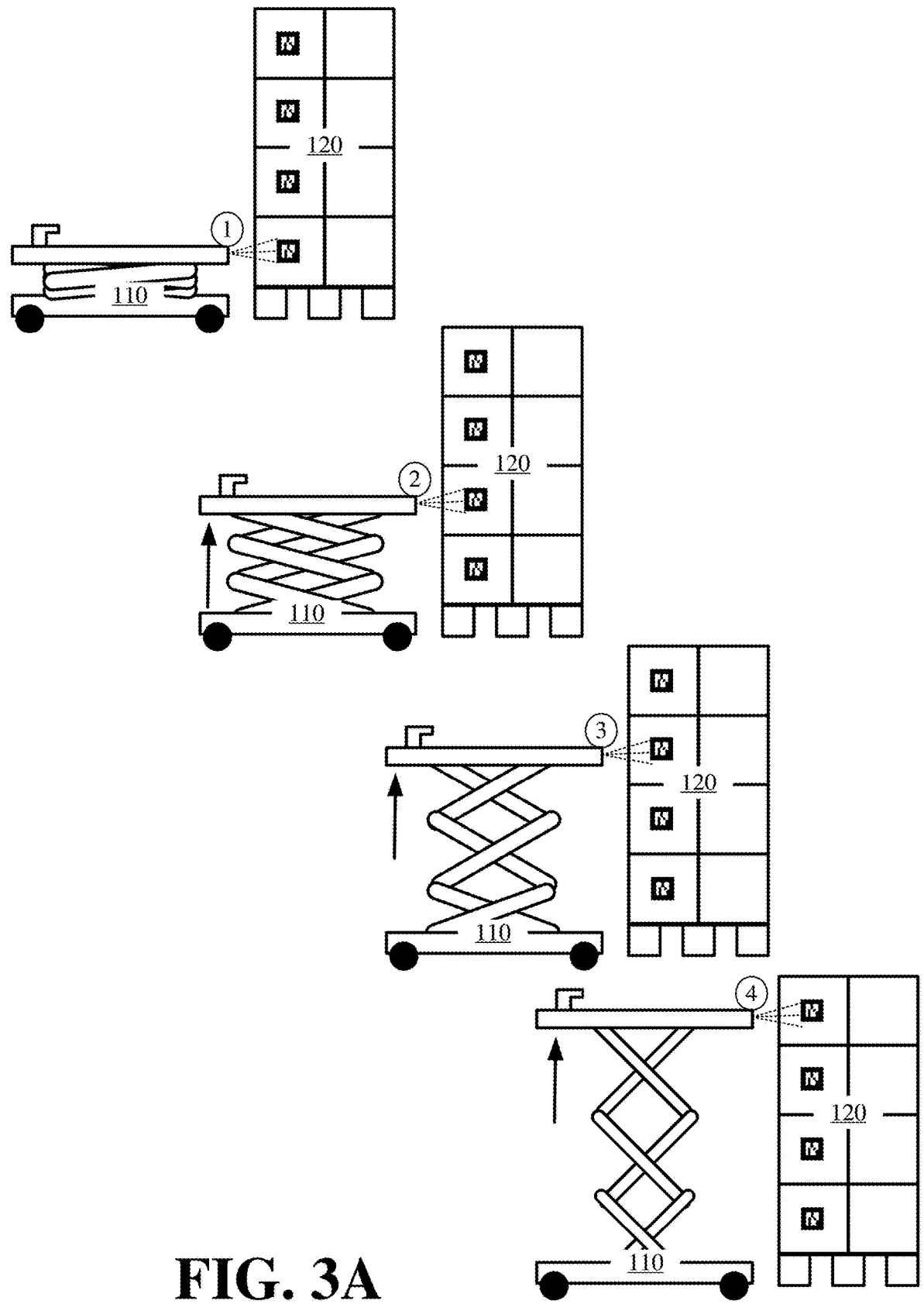
FIGS. 3A and 3B illustrate another method of operation by which a robot performs automated depalletizing in accordance with some embodiments.
Figure 3B:
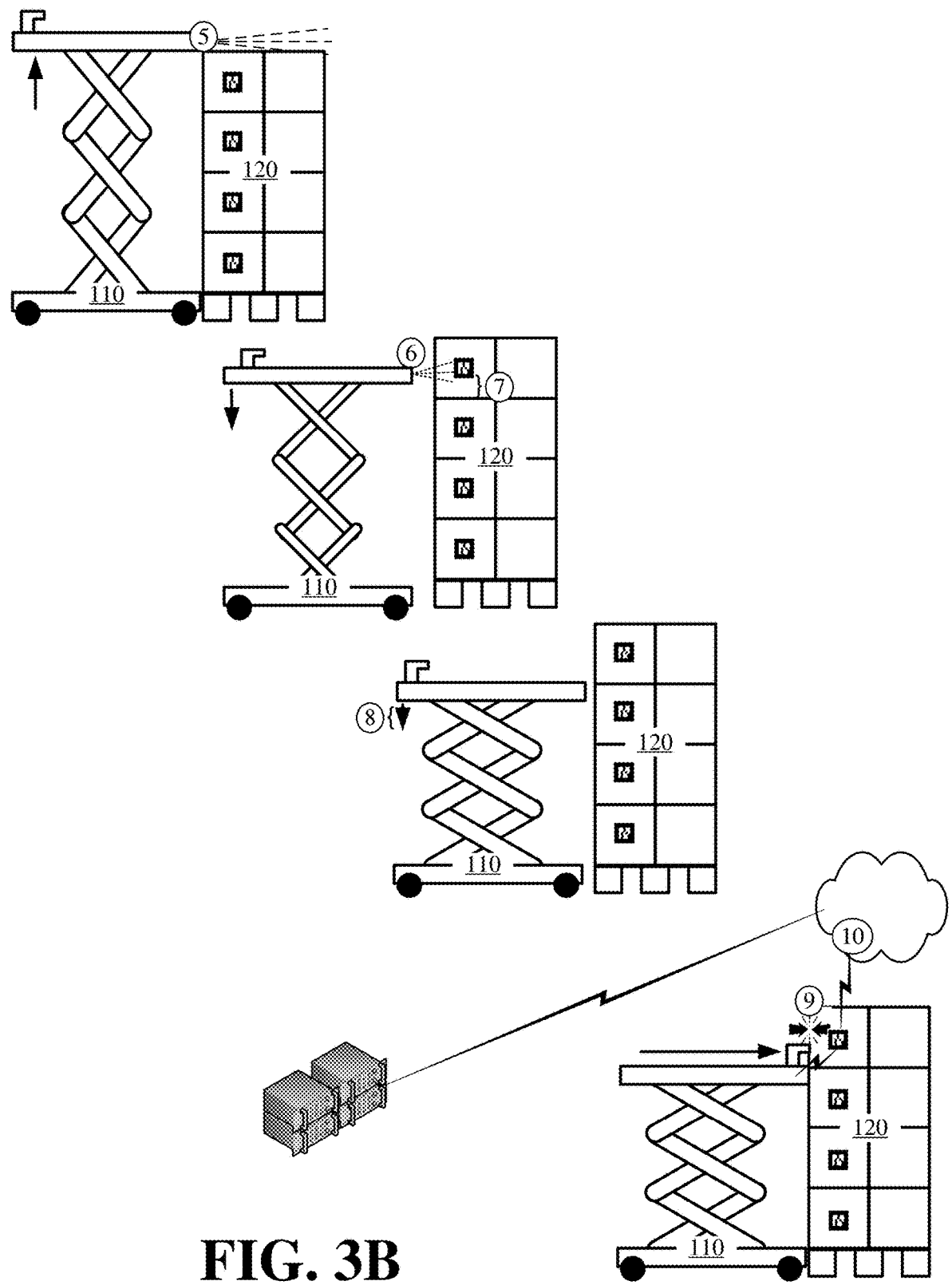

FIGS. 3A and 3B illustrate another method of operation by which robot 110, using various onboard sensors, actuators, wireless radios, motors, and/or other mechanical elements, performs automated depalletizing in accordance with some embodiments. The automated depalletizing operations of FIGS. 3A and 3B may be initiated in response to providing an identifier associated with a pallet 120 that is waiting to be depalletized to one or more robots 110, and having at least one robot 110 move to a location of pallet 120.

Upon arriving before pallet 120, robot 110 may scan an identifier of pallet 120 to verify the scanned identifier matches with the identifies that was provided to robot 110. A match indicates that robot 110 is before the correct pallet. Robot 110 may obtain information about objects on pallet 120 as part of receiving the provided identifier. Alternatively, robot 110 may obtain information about objects on pallet 120 in response to scanning the identifier of pallet 120 and either querying memory using the scanned identifier for the object information, or submitting the scanned identifier to a remote server and receiving the object information from the remote server. In some embodiments, robot 110 may obtain object information including fiducials and/or visual features that can be used to differentiate the objects on pallet 120, the number of objects in the stacked arrangement, dimensions of the objects, and/or other data that robot 110 may use to more efficiently identify the topmost object on pallet 120.

For instance, FIG. 3A illustrates robot 110 gradually raising its lift, and identifying (at 1, 2, 3, and 4) one or more fiducials or visual features of the objects on pallet 120 as the lift is raised. Robot 110 uses a sensor to identify each fiducial or visual feature. The fiducials may be barcodes or other markers that encode some information. The sensor may shine light on the fiducial, and scan the fiducials based on the reflected light. The visual features may be any visible marking or distinctive visual element of an object on pallet 120. For instance, the visual features may include design elements, lettering, shapes, and/or colors. The sensor may be a camera that takes one or more images of the visual features. An onboard processor of robot 110 may perform image analysis and/or feature matching to detect the visual features and their placement or positioning within the images. In some embodiments, robot 110 may send the images to a remote server, and the remote server may perform the feature matching on behalf of robot 110 and provide robot 110 with the feature matching results. In some embodiments, an identified fiducial and/or visual feature may correspond to a particular location about an object. For instance, a particular visual feature may appear at the center of each object in pallet 120. Robot 110 may obtain information about the visual feature locations based on the scanned identifier of pallet 120.

Robot 110 may continue to raise (at 5) the platform over the topmost object until no more objects are detected. Robot 110 may lower (at 6) the platform until the visual feature of the topmost object is once again scanned. From identifying the visual feature and the obtained information about the positioning of the visual feature, robot 110 may determine (at 7) an additional distance to lower (at 8) the platform in order to align the platform with the bottom of the topmost object. For instance, robot 110 may scan a fiducial and/or image a particular visual feature of the topmost object, and may lower the platform one additional foot when the fiducial or the particular visual feature is positioned one foot above the bottom of the object.

Once the platform is aligned with the bottom of the topmost object, robot 110 may retrieve (at 9) the topmost object onto the platform, lower the platform, and return the retrieved object to storage. Additionally, robot 110 may provide (at 10) a remote server with the identified fiducial or visual feature of the retrieved object, and the remote server may update an inventory record and/or a record of objects remaining on pallet 120.

In some embodiments, robot 110 may obtain additional information about objects on pallet 120 prior to extracting the objects from pallet 120. The additional information may be used to make the identification and extraction of the topmost object more efficient.

Figure 4A:
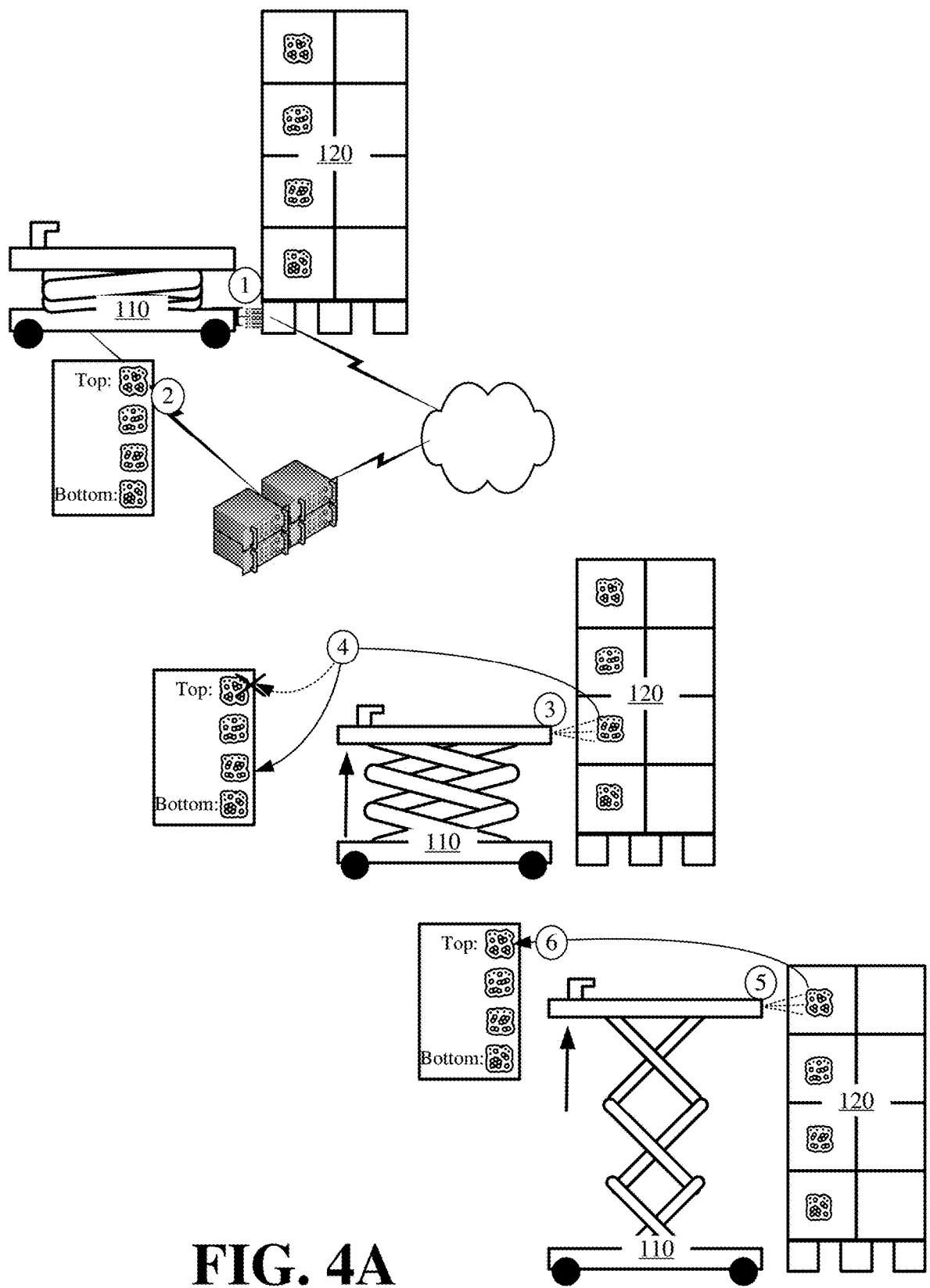
FIGS. 4A and 4B illustrate a robot using additional information obtained for objects on a pallet in order to optimize the automated depalletizing in accordance with some embodiments described herein.
Figure 4B:
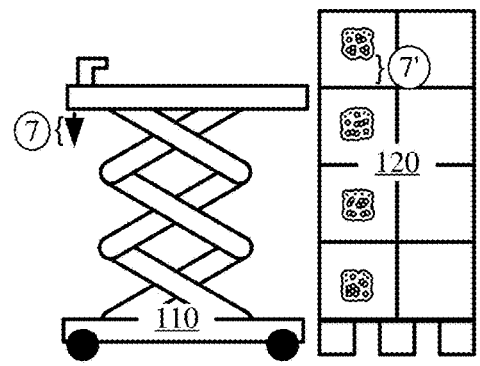
Figure 4B:
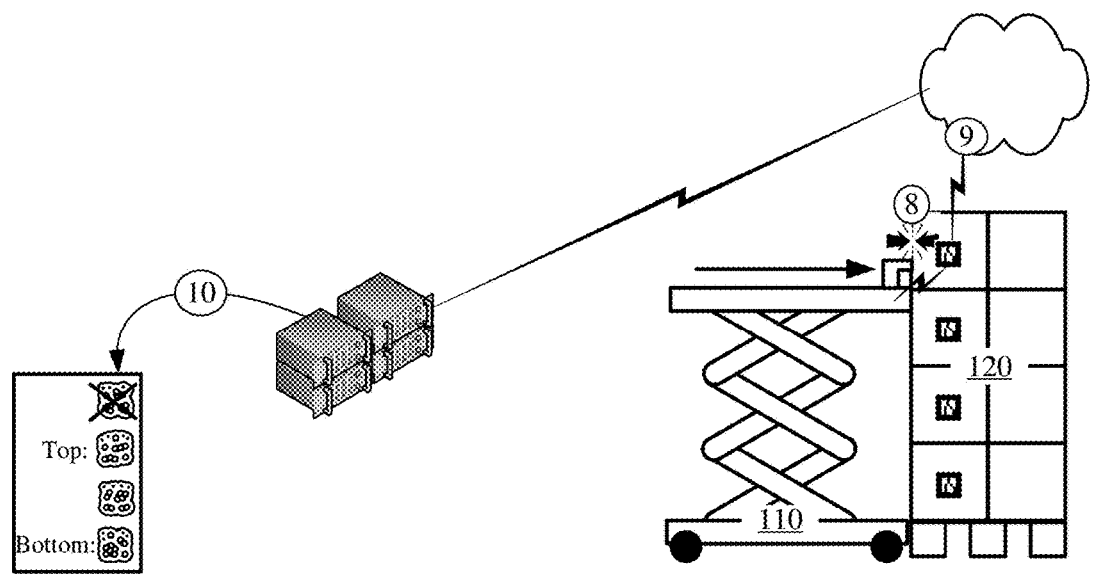

FIGS. 4A and 4B illustrate robot 110 using additional information obtained for objects on pallet 120 in order to optimize the automated depalletizing in accordance with some embodiments described herein. The additional information may specify the number of objects in the stacked arrangement of pallet 120, and/or different fiducials or visual features of each object in the stacked arrangement. Robot 110 may obtain the additional information as part of the instruction from a remote server to depalletize pallet 120. Alternatively and as shown in FIG. 4A, robot 110 may obtain the additional information by scanning (at 1) the identifier of pallet 120, and obtaining (at 2) information about objects on pallet 120 from a remote server in response to submitting the scanned identifier to the remote server.

In FIG. 4A, robot 110 receives (at 2) a unique list of fiducials and/or visual features associated with each object on pallet 120, and a corresponding ordering of the fiducials and/or visual features. In some embodiments, each object on pallet 120 may have the same fiducial or visual feature. However, the additional information may identify the number of objects in each vertical stack on pallet 120.

Robot 110 may then raise its platform while a sensor about the platform scans (at 3) and/or identifies fiducials and/or visual features of the objects on pallet 120. Robot 110 may compare each scanned fiducial or identified visual feature against the object list and ordering in order to determine (at 4) if the topmost object has been reached. For instance, robot 110 may determine if a scanned fiducial or identified visual feature is unique to the topmost object on pallet 120, or may determine whether it has scanned a particular number of fiducials or identified a particular of visual features to have reached the topmost object on pallet 120. Robot 110 continues to raise the platform until robot 110 scans (at 5) a fiducial and/or identifies a visual feature and determines (at 6), based on the obtained additional information about the object on pallet 120, that the fiducial and/or visual feature identifies the topmost object on pallet 120.

As shown in FIG. 4B and in response to identifying the topmost object, robot 110 lowers (at 7) the platform to align the platform with the bottom of the topmost object. The distance to lower the platform may be derived (at 7') from the obtained information providing a position of the fiducial or visual object about the object, dimensions of the object, and/or distance from the fiducial or visual object to the bottom of the object.

Robot 110 may then use its retriever (at 8) to engage and extract the topmost object from pallet 120, before lowering the platform, and placing the retrieved object in storage. Robot 110 may also notify the remote server of the removal of the topmost object by sending (at 9) the fiducial, visual feature, and/or other identifier associated with the topmost object to the remote server. The remote server may then update (at 10) the information for pallet 120 so that if another robot is used to extract the next topmost object, the robot is provided with updated information as to the objects remaining on pallet 120.

The use of robot's 110 onboard sensor enables the specialized methods of operation by which robot 110 is able to autonomously depalletize objects from pallet 120, and still be able to depalletize objects from other pallets that may have different stacked arrangements and/or objects of different sizes, shapes, weights, and/or other dimensions. In other words, the robot 110, via the specialized methods of operation illustrated in the figures above, dynamically adjusts its operations based on detected pallet configurations and detected objects on the pallets.

Figure 5:
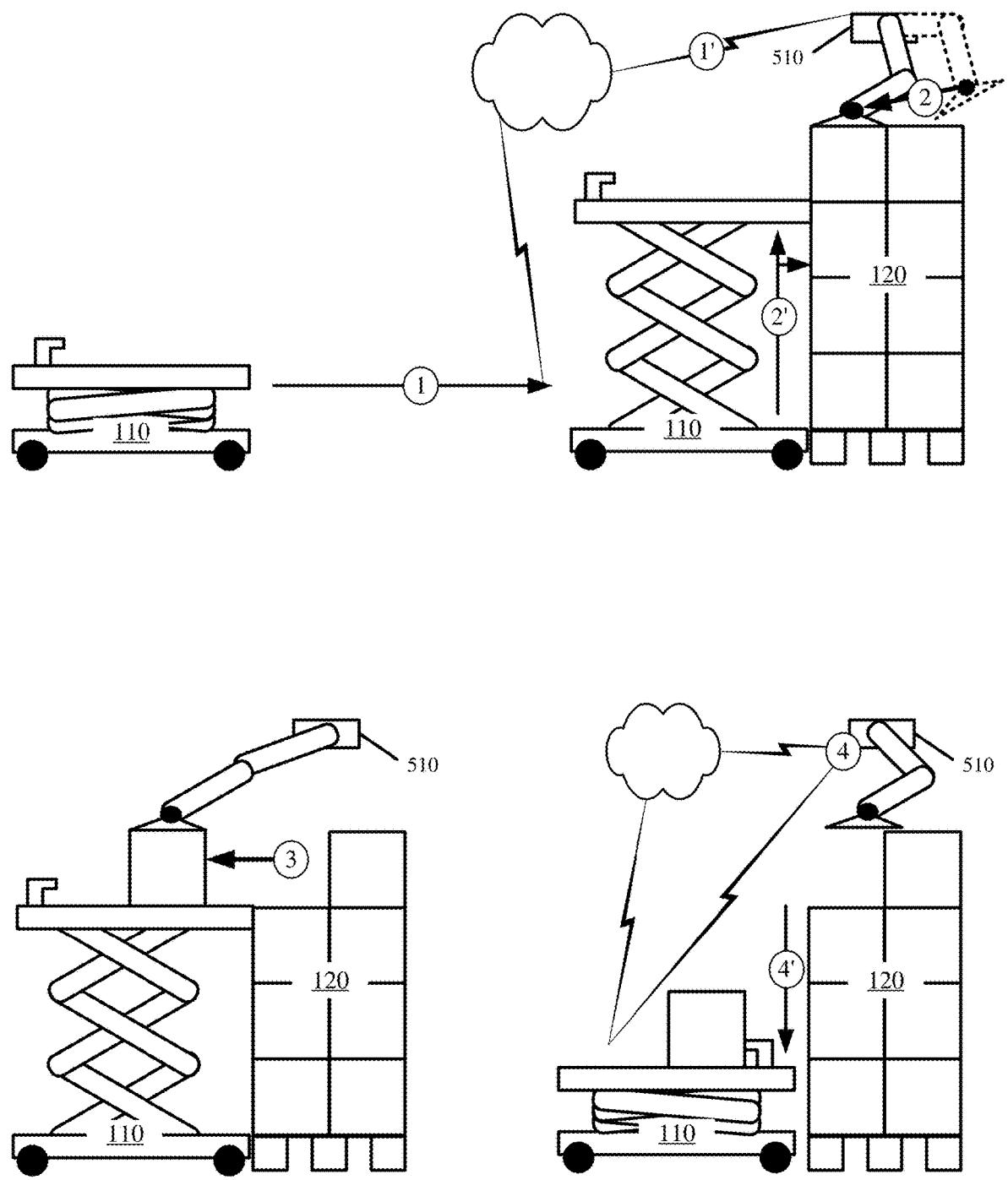
FIG. 5 illustrates an example of automated depalletizing via coordinated and synchronized robot operation in accordance with some embodiments described herein.

Some embodiments perform the automated depalletizing based on the coordinated and synchronized operation of two or more robots. The coordinated and synchronized operation may use two or more robots to expedite the extraction of objects from a pallet by partitioning the depalletizing tasks between the two or more robots. FIG. 5 illustrates an example of automated depalletizing via coordinated and synchronized robot operation in accordance with some embodiments described herein.

FIG. 5 illustrates robot 110 coordinating its operation with second robot 510. Second robot 510 may include a robotic arm, such as delta robotic arm, that is fixed to a ceiling or other structure above pallet 120. The coordinated operation of robots 110 and 510 may improve the rate at which objects are extracted from pallet 120, and/or are entered into storage. Multiple robots 110 may coordinate their operations with robot 510 to further increase the depalletizing rate.

As shown in FIG. 5, robot 110 may move (at 1) towards pallet 120 in response to receiving messaging to depalletize objects from pallet 120. Robot 110 may wirelessly message (at 1') robot 510 upon robot 110 arriving at pallet 120. Alternatively, robot 510 may detect the arrival of robot 110 before pallet 120. The wireless messaging and/or detection by robot 510 triggers a specialized coordinated and synchronized depalletizing procedure that is performed by robots 110 and 510. The specialized coordinated and synchronized depalletizing procedure may include a sequence of concerted operations that specifically leverage the functionalities and operational capabilities of robots 110 and 510 in order to streamline the transfer of objects from pallet 120 into storage. The sequence of concerted operations maximizes robot throughput and minimizes time either robot 110 or 510 is idle, while ensuring that the transferred objects are not damaged and are correctly placed.

As shown in FIG. 5, the sequence of concerted operations may include robot 510 identifying and engaging (at 2') the topmost object on pallet 120, while robot 110 aligns (at 2) its platform with the topmost object. As in FIG. 1, robot 110 may perform a two-step alignment that aligns a height of the platform to a bottom of the topmost object on the stacked arrangement of pallet 120, and that further aligns the platform about centrally to the bottom of the topmost object. The alignment of robot 110 must also be coordinated with the topmost object that is engaged by robot 510. For instance, pallet 120 may include left and right topmost objects. Robots 110 and 510 may communicate with one another, via wireless messaging, as to which of the two topmost objects to extract first. Alternatively, one of robots 110 and 510 may monitor movements of the other in order to coordinate retrieval of the same topmost object. Robot 510 may use one or more of a grasping, suction, and/or magnetic mechanism to engage the topmost object. Robot 510 may include one or more cameras and/or sensors to detect the topmost and/or closest object to robot 110.

The sequence of concerted operations may further include robot 510 moving (at 3) the engaged topmost object on the platform of robot 110. In some embodiments, the sequence of concerted operations may cause robot 510 to delay moving the engaged topmost object until the platform of robot 110 is aligned with the topmost object. Coordinating the operations and timing of robots 110 and 510 may prevent the topmost object and/or other objects on pallet 120 from being damaged when robot 510 slides the topmost object from pallet 120 onto the platform of robot 110, and/or lifts and places the topmost object from pallet 120 onto the platform of robot 110. For instance, robot 510 may be unable to reach the platform of robot 110 if the platform is not aligned with pallet 120, or robot 510 may use the platform to support some of the weight of the topmost object and, if the platform is not aligned, the topmost object may be dropped or otherwise damaged. Accordingly, robot 110 may wirelessly signal robot 510 when the platform is aligned. In some embodiments, robot 510 may detect when the platform of robot 110 is properly aligned in order to move (at 3) the engaged topmost object onto the platform.

Robot 510 may wirelessly signal (at 4) robot 110, via one or more wireless networks, once the topmost object has been placed onto the platform and/or robot 510 has disengaged the topmost object. In some embodiments, robot 110 may use one or more sensors about its platform to detect placement of the object on the platform. For instance, the platform may include load cells that can detect the weight of the object, and/or cameras to detect when the object is properly placed on the platform and disengaged by robot 510. Robot 110 may begin transferring (at 4') the object into storage. Another robot 110 may then position itself before pallet 120, thereby triggering robot 510 to retrieve the next topmost object from pallet 120.

In FIG. 5 the coordinated depalletizing procedures is between one or more of a first set of robots (e.g., robot 110) and a second robot (e.g., robot 510). For instance, robot 510 may retrieve objects from pallet 120, and may transfer the retrieved objects to different robots 110 of the first set of robots that arrive in order to transfer different objects.

Figure 6:
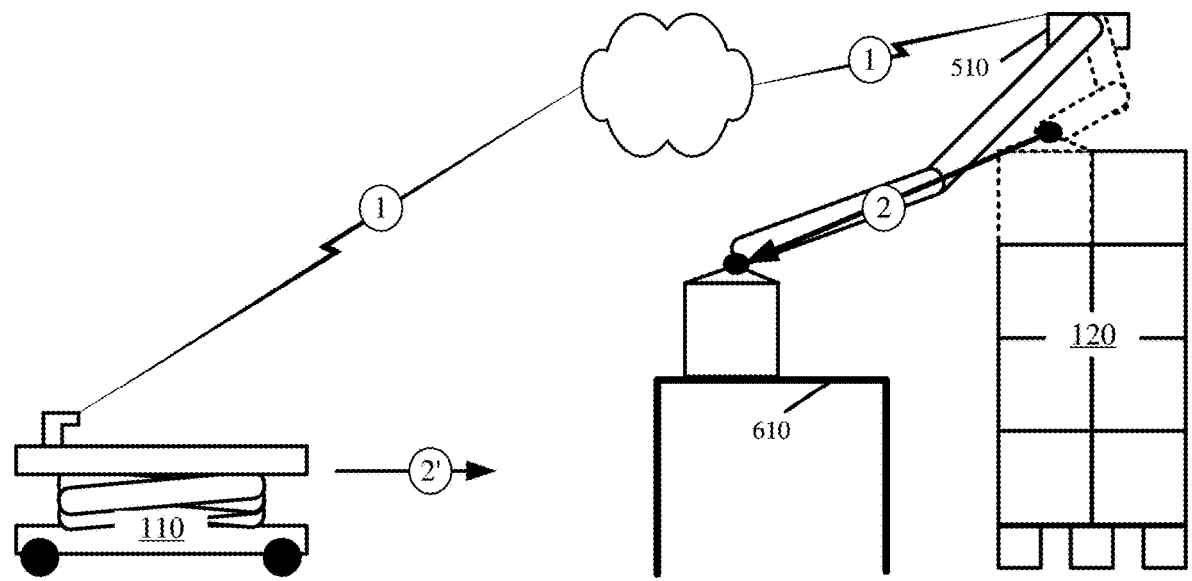
FIG. 6 illustrates the autonomous and robotic unsynchronized depalletizing in accordance with some embodiments described herein.
Figure 6:
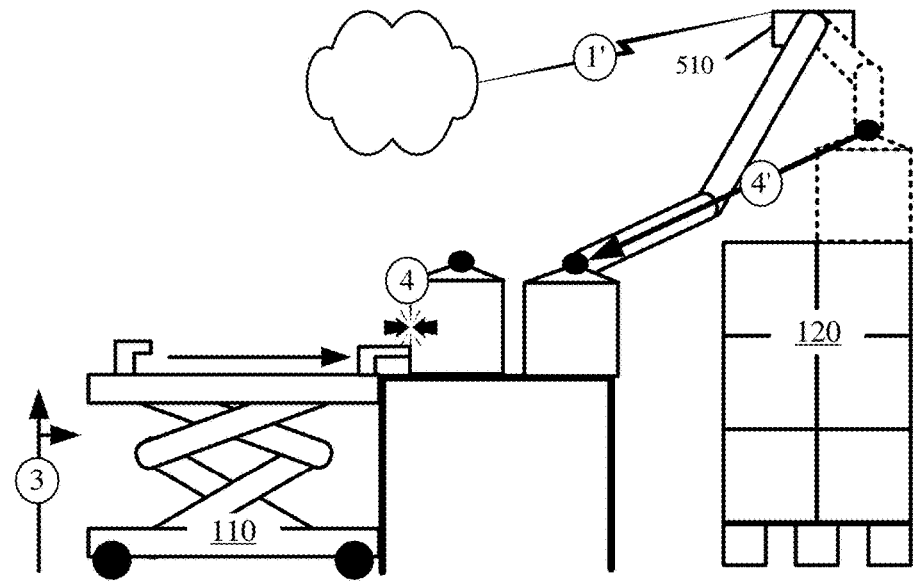

In some embodiments, a temporary storage location is used to allow for unsynchronized depalletizing of pallet 120 by two or more robots. FIG. 6 illustrates the autonomous and robotic unsynchronized depalletizing in accordance with some embodiments described herein.

As shown in FIG. 6, robots 110 and 510 may receive (at 1) commands to depalletize objects from pallet 120 in an unsynchronized manner using temporary storage 610. Temporary storage 610 may be a table, rack, or other storage apparatus that can be moved and placed adjacent to different pallets 120.

As robot 110 moves (at 2') to temporary storage 610, and before robot 110 arrives at temporary storage 610, robot 510 may transfer (at 2) one or more objects from pallet 120 onto temporary storage 610. Upon robot 110 arriving and repositioning (at 3) before temporary storage 610, one or more objects from pallet 120 may already have been transferred (at 2) to temporary storage 610. Consequently, robot 110 may retrieve (at 4) an object from temporary storage 610 as robot 510 continues to transfer (at 4') other objects from pallet 120 to temporary storage 610.

Robot 510 need not wait for robot 110 in order to perform its subset of depalletizing tasks. Similarly, robot 110 can perform its different subset of depalletizing tasks while robot 510 is performing other tasks. In this manner, robots 110 and 510 in FIG. 6 are able to depalletize objects from pallet 120 in an unsynchronized but still coordinated manner.

In some embodiments, the unsynchronized operation may increase efficiency of robots 110 and 510. For instance, one robot may complete its tasks faster than the other robot. The unsynchronized operation allows the faster robot to continue operating without stalling for the slower robot to complete its tasks. The unsynchronized operation also allows multiple instances of the slower robot to be used to keep up with the speed of the faster robot. Assume, for example, that in FIG. 6, robot 510 transfers objects from pallet 120 to temporary storage 610 at twice the speed as robot 110 can retrieve and transfer objects from temporary storage 610. In this scenario, two instances of robot 110 may be used to retrieve and transfer objects from temporary storage 610 in order to keep pace with robot 510 and achieve the optimal depalletizing rate.

Figure 7:
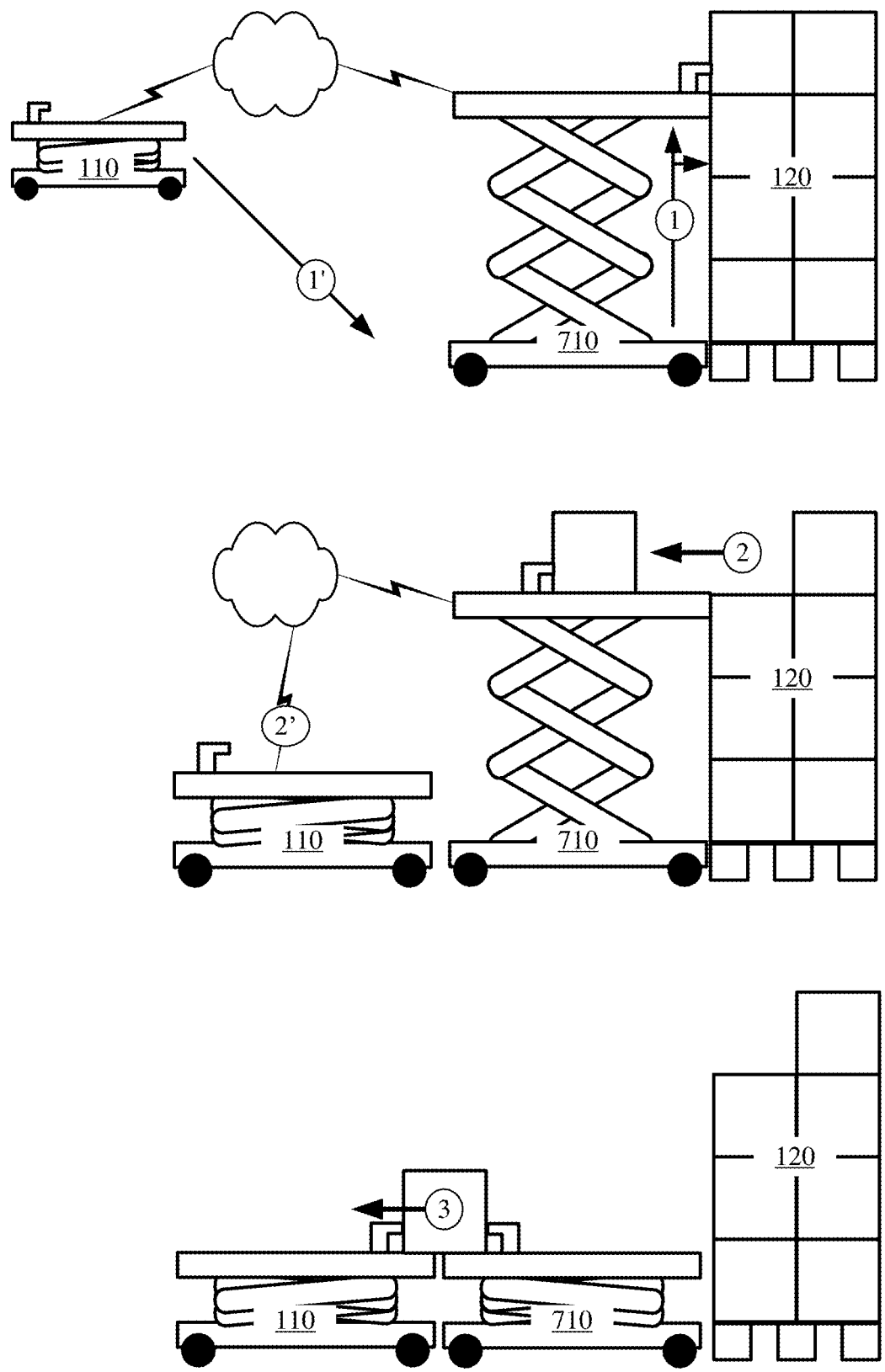
FIG. 7 illustrates an example of automated depalletizing via coordinated operation of the same or similar robots in accordance with some embodiments described herein.

In some embodiments, different instances of the same robot (e.g., the first set of robots or robot 110) can be used to perform different portions of the automated depalletizing. Reusing the same robot for different portions of the automated depalletizing may lead to reduced costs as less time and money is devoted to robot development. FIG. 7 illustrates an example of automated depalletizing via coordinated operation of the same or similar robots in accordance with some embodiments described herein.

In FIG. 7, robot 110 may coordinate its operation with a similar robot 710. In particular, robot 110 may transfer objects that are retrieved from pallet 120, and robot 710 may retrieve the objects from pallet 120 and may provide the retrieved objects to robot 110. The coordinated operation may include robot 710 aligning itself relative to a topmost object of pallet 120, and retrieving (at 1) the topmost object from pallet 120 as robot 110 moves (at 1') towards pallet 120. Robot 710 may use one or more sensors to identify the topmost object, align its platform with a bottom of the topmost object, and determine when the retriever has engaged the topmost object for retrieval. Robot 110 may wirelessly notify robot 710 when it is near pallet 120 in order to trigger the coordinated operation. Alternatively, robot 710 may detect when robot 110 approaches pallet 120.

Upon robot 110 arriving before pallet 120, robot 710 may have completed retrieving (at 2) the object, and may commence the transfer (at 3) of the retrieved object to robot 110. Transferring (at 3) the retrieved object may involve additional coordinated activity by robots 110 and 710. In particular, robot 710 may turn to face robot 110, and may lower its lift to a preset height at which the transfer occurs. Meanwhile, robot 110 may align its positioning so that its platform is at the same height and/or is centered with the platform of robot 710. Robots 110 and 710 may have sensors about their respective platforms to achieve the alignment for safe and coordinated transfer of the object from robot 710 to robot 110.

Transferring (at 3) may further include robot 110 extending its retriever towards robot 710 while robot 710 uses its retriever to push the retrieved object closer to robot 110. Robot 110 may use its retriever to engage the object, and assist in the transfer of the object on the platform of robot 110. For instance, robot 710 may push the object halfway onto the platform of robot 110 at which point robot 110 engages the object with its retriever and retracts the retriever to pull the object further onto the platform of robot 110.

In some embodiments, robot 110 may provide (at 1") a first message to robot 710 when robot 110 is a first distance from pallet 120 and is approaching pallet 120. In response to receiving (at 1") the first message, robot 710 may commence retrieval (at 1) of the topmost object from pallet 120. Robot 110 may subsequently provide (at 2') a second message to robot 710 when robot 110 is a closer second distance from pallet 120. In response to receiving the second message, robot 710 may transfer (at 3) the retrieved object to robot 110. Robot 110 may then enter the object into storage while robot 710 retrieves a next topmost object from pallet 120 for another robot that is queueing near pallet 120.

Figure 8:
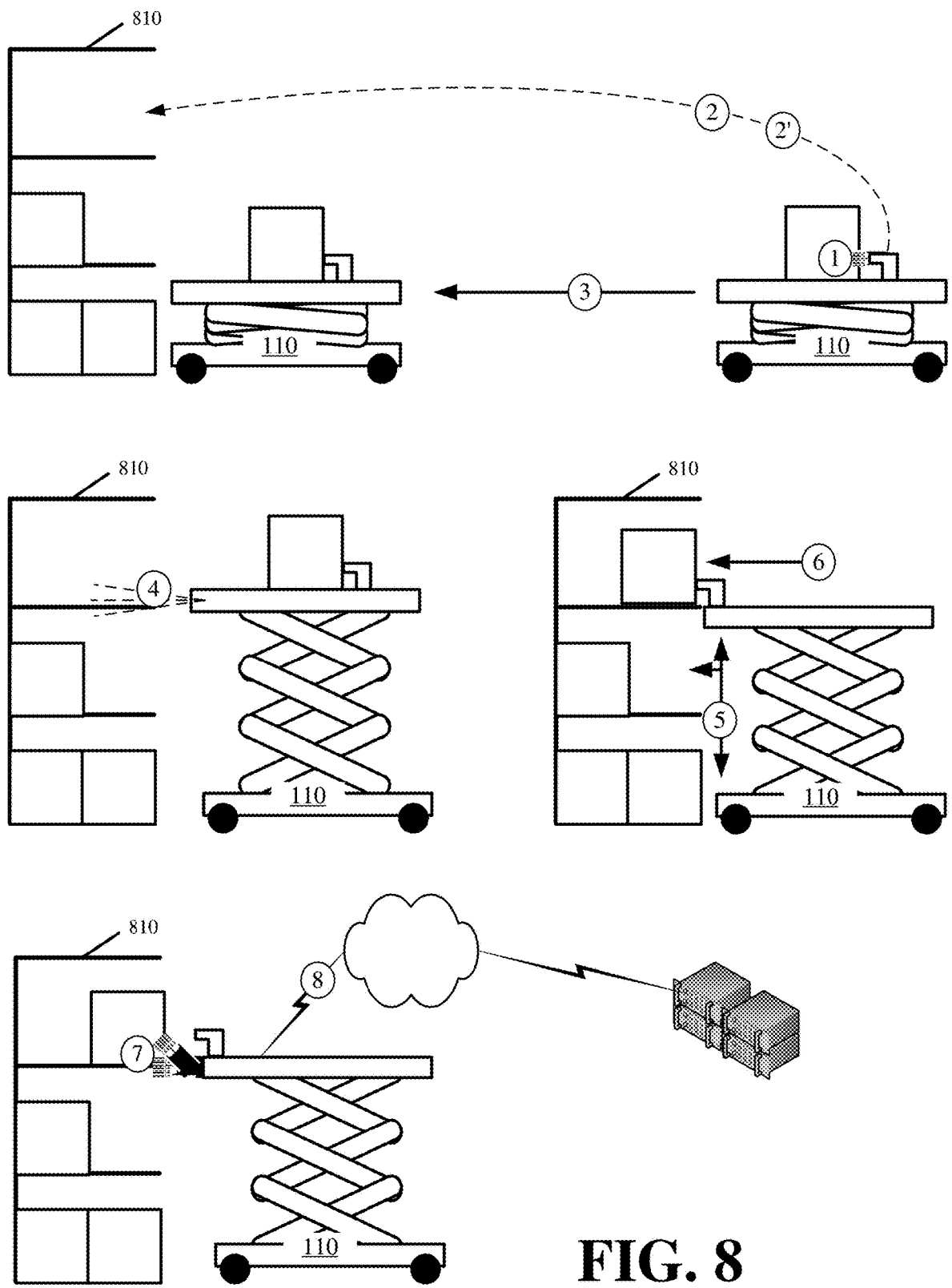
FIG. 8 illustrates an example of a robot transferring a depalletized object into storage in accordance with some embodiments described herein.

FIG. 8 illustrates an example of robot 110 transferring a depalletized object into storage in accordance with some embodiments described herein. In FIG. 8, robot 110 may transfer the depalletized object to storage rack 810. Robot 110 may identify a particular storage rack from a plurality of storage racks to transfer the object to based on the object that is being transferred. For instance, the object may have a static location in the warehouse corresponding to storage rack 810. The static location may be where other units of the same object are stored.

As shown in FIG. 8, robot 110 may scan (at 1) an identifier associated with pallet 120 or the retrieved object, and may map (at 2) the identifier to information about the object including the particular storage rack where the object should be stored. In some embodiments, the one or more scanned identifiers may map to additional information such as the demand and/or dimensions of the object. Based on the demand and/or dimensions, robot 110 may dynamically select (at 2') a storage location or storage rack 810 for storing the retrieved object, and may move (at 3) to the selected location or rack 810.

Robot 110 may identify (at 4) an empty location about storage rack 810 where the depalletized object is to be stored (e.g., with other units of the same object). For instance, storage rack 810 may be used to store the retrieved object and/or other units of the same object at a designated location about rack 810, or may set a designated location for the retrieved object. The identifier mapping (at 2) may identify the designated location, and robot 110 may identify and/or create an empty space at that designated location. In a dynamic storage scenario, rack 810 may store different objects in different spaces. Robot 110 may select (at 2') storage rack 810, and may identify (at 4) an empty location upon arriving at rack 810 by scanning for the empty location. To scan for the empty location, robot 110 may raise its lift and use a sensor about the platform atop the lift to identify (at 4) the empty location to store the retrieved object. In some embodiments, robot 110 and/or an inventory management system may track empty locations about different racks 810 may direct robot 110 to a particular location about rack 810 in response to robot 110 scanning (at 1) the object identifier, and wirelessly providing the scanned identifier to the inventory management system. Robot 110 may determine the empty location using a camera and/or other sensors. The empty location may correspond to an empty space next to, in front of, or above another unit of the same object at rack 810. Alternatively, robot 110 may create the empty location by pushing the object into other objects in rack 810 when rack 810 is organized for last in first out access.

To transfer the object to the empty location, robot 110 may align (at 5) the object with the identified empty location. Once again, robot 110 may perform a two-stage alignment by manipulating a lift that raises or lowers the platform on which the object rests to a height of the empty location, and by positioning the platform to be parallel to and centered about the empty location. Once robot 110 is properly aligned, robot 110 may enter (at 6) the object to the storage location by pushing or otherwise transferring the object from the platform to the empty location on rack 810.

Robot 110 may scan (at 7) a first identifier corresponding to the storage location that the object now occupies (e.g., a fiducial at the storage location), and/or a second identifier that is associated with the stored object (e.g., a fiducial on the object). The first identifier may be used to confirm that the object is stored to the correct rack and/or storage location (e.g., rack 810).

Robot 110 may wirelessly transmit (at 7) the first identifier and/or the second identifier to an inventory management system or database in order to update a record that is used to track the object in the warehouse. In particular, the first and second identifiers may be used to map the object to the corresponding storage location. The scanned identifiers may also be used to updated a quantity of the object that is stored in the warehouse.

In some embodiments, robot 110 may store a depalletized object in a storage location that includes other objects. For instance, robot 110 may place an object on a storage rack that includes other items of the same object. The objects may have a particular arrangement on the storage rack. For instance, the objects may be placed in front of one another, next to one another, or atop one another. When the objects at a storage location are placed in front of one another, robot 110 may identify the frontmost object, align its positioning (e.g., the platform with a retrieved object) with the frontmost object, and may push a retrieved object from its platform, using the retriever, into the frontmost object. The other objects may be pushed back into the storage location with the retrieved object being placed as the new frontmost object. When the objects at a storage location are placed atop one another, robot 110 may identify the topmost object, align its platform with a top face of the topmost object, and may place the retrieved object from its platform onto the topmost object.

Figure 9:
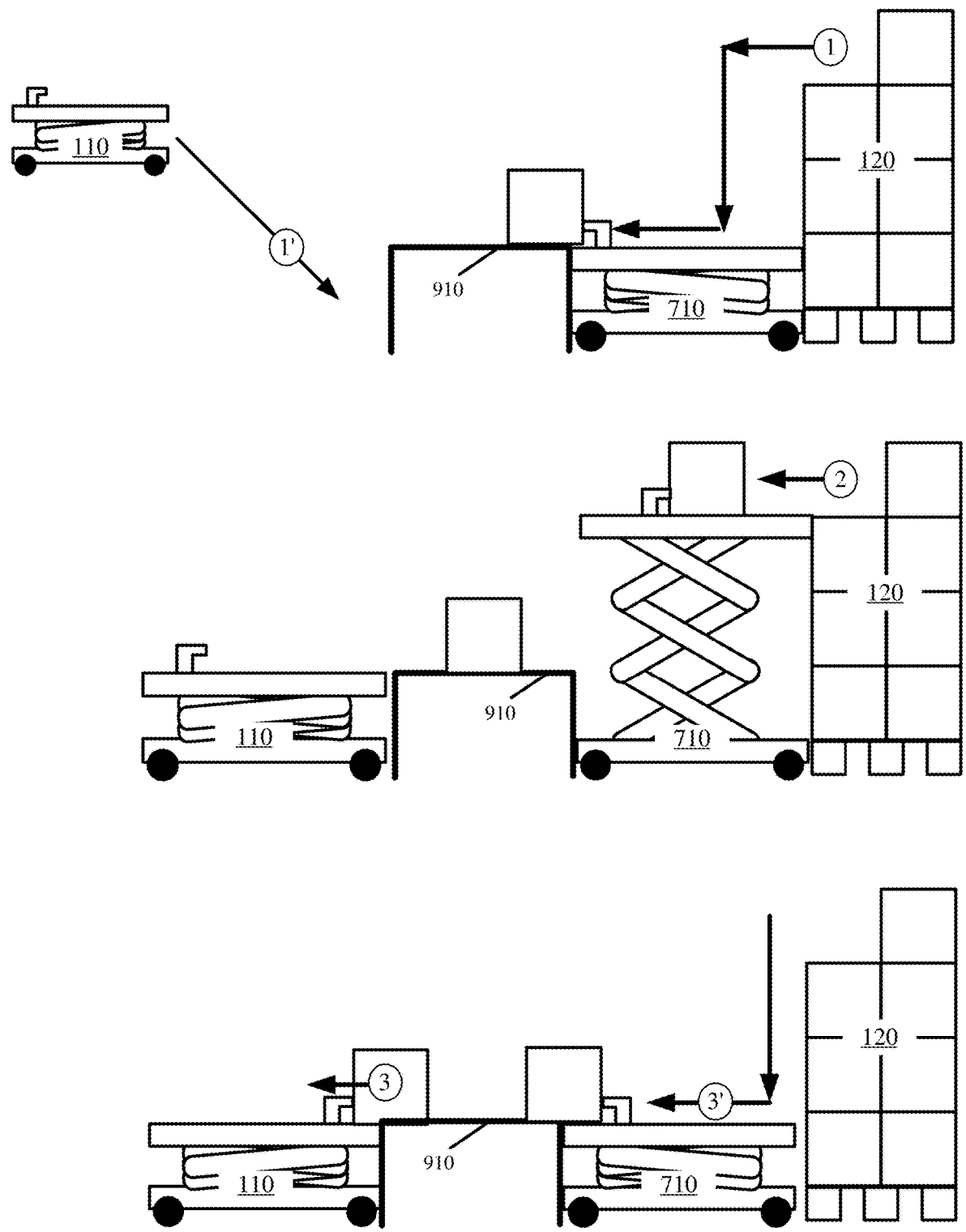
FIG. 9 illustrates unsynchronized depalletizing by two robots in accordance with some embodiments described herein.

The coordinated depalletizing operation of two instances of the same robot, as shown in FIG. 7, can also be performed in an unsynchronized manner. FIG. 9 illustrates unsynchronized depalletizing by two robots in accordance with some embodiments described herein.

As shown in FIG. 9, robot 710 may be tasked with removing objects off pallet 120 and placing them on temporary storage 910. Robot 710 may have already transferred (at 1) a first object from pallet 120 to temporary storage 910 as robot 110 moves (at 1') to temporary storage 910.

Rather than wait for robot 110 to arrive to receive the first object, robot 710 places the first object to temporary storage 910, and begins retrieval (at 2) of a second object from pallet 120. Upon arriving at temporary storage 910, robot 110 may retrieve (at 3) the first object from temporary storage 910 while robot 710 contemporaneously places the second object to temporary storage 910. Here, as in FIG. 6, the unsynchronized but coordinated operation of robots 110 and 710 may accelerate the depalletizing rate, and may improve overall robot efficiency. Even though the same robots may be performing different tasks, some tasks may take longer to complete. Accordingly, the unsynchronized operation allows the one or more robots performing the quicker tasks to continue operating without dependence on one or more other instances of the same robot performing the slower tasks. Additional robots performing the slower tasks may be deployed in order to optimize the overall task execute rate and maintain pace of the robots performing the quicker tasks.

Figure 10:
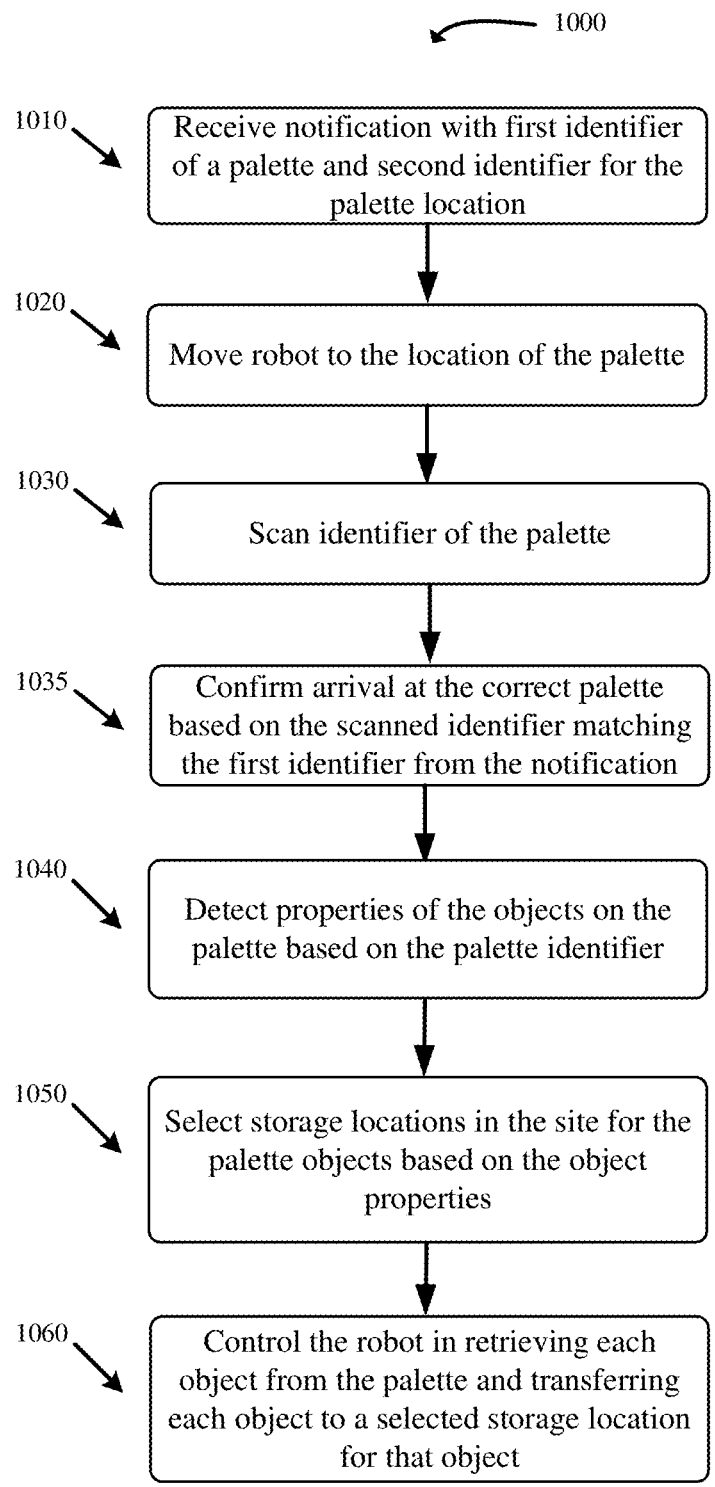
FIG. 10 presents a process for automated depalletizing and inventory storage performed by one or more depalletizing robots in accordance with some embodiments described herein.

FIG. 10 presents a process 1000 for automated depalletizing and inventory storage performed by one or more depalletizing robots in accordance with some embodiments described herein. Process 1000 may include receiving (at 1010) notification of a pallet with objects that are ready for transfer into storage. The notification may be provided via wireless messaging to robot 110. The wireless messaging may be triggered in response to detecting arrival of a delivery truck and/or offloading the pallet from the delivery truck. For instance, a human or other robot may scan a first identifier associated with the pallet when the pallet is received and/or its objects are ready for transfer into storage, and scan a second identifier associated with the location of the pallet in the site. The scanned identifiers may be sent to a remote server that controls operations of robots 110. The first identifier may include a barcode, fiducial, radio frequency identifier ("RFID"), and/or other scannable or detectable value that is located on the pallet or is associated with the pallet. The second identifier may include a value that identifies a location of the pallet in the site. For instance, the second identifier may be a scannable fiducial on the floor adjacent to the pallet, and the human or other robot scans the second identifier to identify the pallet's location. In some embodiments, the second identifier may be a set of coordinates or other values that are entered or derived from one or more sensors identifying pallet location. The received (at 1010) notification may provide robot 110 the first identifier for identifying the pallet, and/or the second identifier for identifying the location of the pallet within the site.

Process 1000 may include moving (at 1020) robot 110 to the location of the pallet that is identified from the second identifier. In some embodiments, robot 110 may store a map of the site in order to autonomously navigate to the pallet location upon receiving the second identifier.

Process 1000 may include scanning (at 1030) the first identifier that is associated with the pallet using a sensor of robot 110 when robot 110 arrives at the pallet location. The scanning and matching of the scanned pallet identifier with the first identifier that was received (at 1010) with the notification verifies (at 1035) that robot 110 has located the correct pallet.

Process 1000 may also include detecting (at 1040) one or more properties of the objects on the pallet based on the scanning (at 1030) of the first identifier. For instance, the first identifier may be used to lookup size, weight, shape, order history, demand, and/or other properties associated with the objects.

Robot 110 may adjust its retrieval operation based on the detected size, weight, shape, and/or other dimensions of the objects, and may select (at 1050) storage locations in the site for the pallet objects based on the dimensions and/or demand for the objects. For instance, larger objects with low demand may be stored further from order fulfillment stations such that closer locations may be used to store and more quickly transfer smaller and high demand objects from the closer locations to the order fulfillment stations.

Process 1000 may then include controlling (at 1060) robot 110 in retrieving each object from the pallet, and transferring each object to a selected (at 1050) storage location for that object. The retrieval may be performed according to any of the automated depalletizing procedures illustrated in FIGS. 1-7 above and/or other automated depalletizing procedures.

Robot 110 may activate and deactivate various actuators, motors, and/or other mechanical elements to retrieve and transfer the objects. Robot 110 may use an onboard processor and various sensors to determine how to manipulate the actuators, motors, and/or other mechanical elements for depalletizing and inventory storage.

Figure 11:
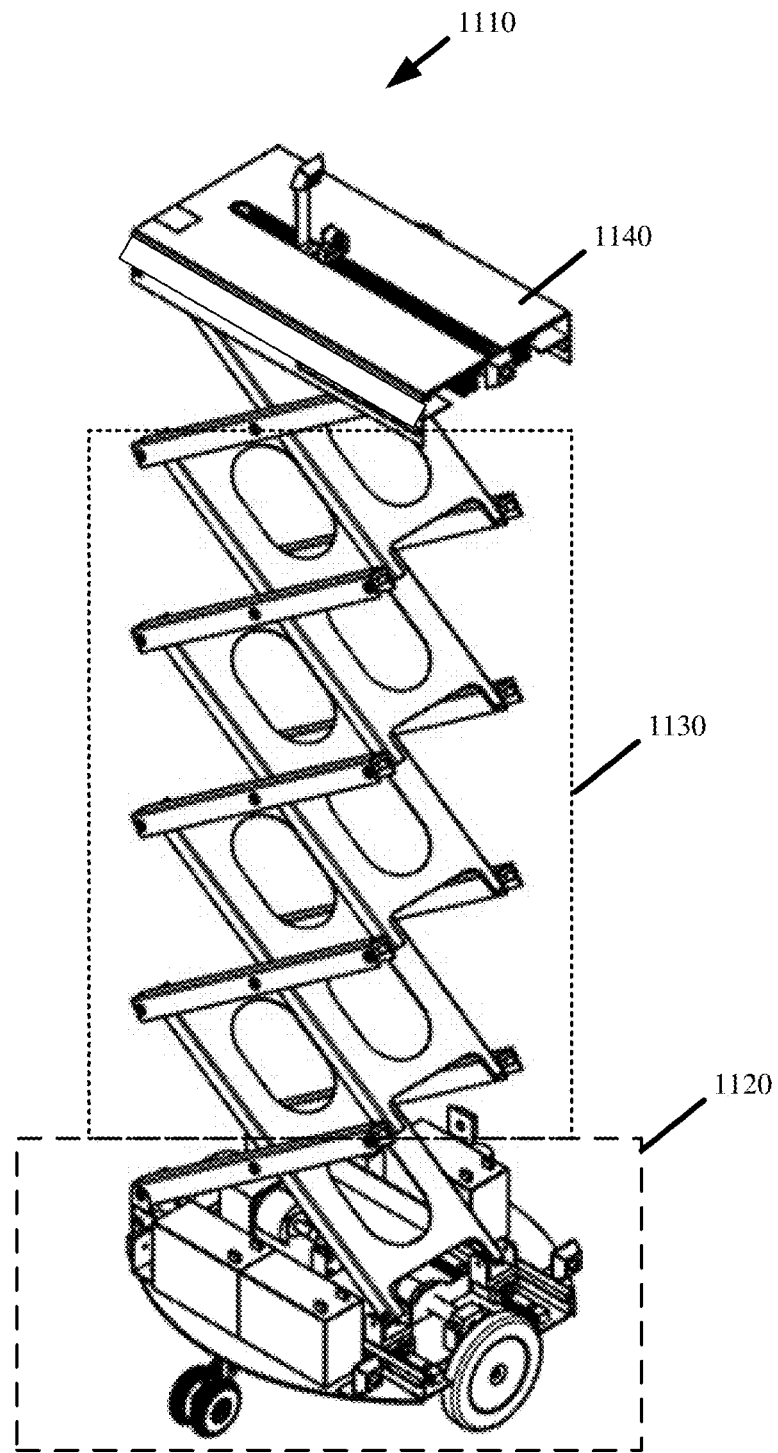
FIG. 11 illustrates an example of a robot for performing automated depalletizing in accordance with some embodiments described herein.

FIG. 11 illustrates an example of a robot for performing automated depalletizing in accordance with some embodiments described herein. Robot 1110 may include a motorized base 1120 on which one or more motors, batteries, processors, wireless radios, sensors, and wheels are mounted. Motorized base 1120 powers locomotion or movement of robot 1110 in three-dimensional space. In some embodiments, motorized base 1120 may include articulating legs, propellers, tracks, or other means of locomotion besides the illustrated wheels.

Atop motorized base 1120 is lift 1130 that raises and lowers platform 1140. As shown, lift 1130 may include a collapsing and expanding structure. In some embodiments, lift 1130 may include a pneumatic piston or other means for raising and lowering platform 1140.

Platform 1140 may include an elongated surface onto which objects retrieved by robot 1110 may be retained during transport. Platform 1140 may also include a mechanical retriever for retrieving containers and/or other objects onto platform 1140. The mechanical retriever may include at least one motor for moving a retrieval element. The retrieval element may include a vacuum that uses suction to engage containers and/or other objects. The vacuum may be located at a distal end of a telescoping or other expandable element that can position the vacuum at different lengths from the robot. For instance, the expandable element may expand several feet in front of robot 1110 in order to place the vacuum at the distal end against an object that is recessed within a storage location. In some embodiments, the retrieval element may alternatively include a gripper, articulating mechanical arm, or other means to grab or otherwise engage containers and/or objects.

Robot 1110 may use one or more onboard processors to coordinate operations with other robots and/or perform the specialized methods of operation for depalletizing objects from a pallet. For instance, the processor may activate and control one or more actuators and sensors of robot 1110 to navigate to a first location of a pallet, align positioning for extract of a topmost object, retrieve the topmost object, and deliver the topmost object to a storage location in a warehouse.

Robot 1110 is presented as one example of an autonomous robot that may perform automated depalletizing. Other robot embodiments and the operations performed by the other robot embodiments may similarly be coordinated and controlled for automated depalletizing according to the methodologies presented herein.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
   directing a robot to a pallet, the pallet comprising a stacked arrangement of a plurality of objects;
   identifying, via a sensor of the robot, a topmost object of the plurality of objects, wherein identifying the topmost object comprises raising a flat platform atop an actuated lift of the robot to a first height until a unique feature of the topmost object or empty space above the topmost object is detected by the sensor of the robot;

aligning a retriever of the robot with the topmost object, wherein aligning the retriever comprises lowering the flat platform from the first height to a lower second height until the sensor detects the flat platform becoming vertically aligned with a bottom of the topmost object;

extending the retriever across the flat platform until the retriever engages the topmost object; and transferring the topmost object from the pallet to the robot by retracting the retriever and sliding the topmost object horizontally off the pallet and unto the flat platform in response to said retracting after the retriever engages the topmost object.

2. The method of claim 1 further comprising:
wirelessly providing a first identifier associated with the pallet to the robot;
scanning an identifier adjacent to the pallet via one or more sensors of the robot; and
verifying arrival at the pallet based on the identifier from said scanning matching to the first identifier.

3. The method of claim 1, wherein said identifying further comprises:
adjusting a height of the sensor to extend over the topmost object in response to raising the flat platform to the first height.

4. The method of claim 3, wherein adjusting the height comprises:
detecting, via the sensor, the first height at which the sensor extends above the topmost object.

5. The method of claim 4, wherein said aligning further comprises:
centering the flat platform by aligning left and rights sides of the flat platform with left and right sides of the topmost object based on movements of the robot.

6. The method of claim 1,
wherein extending the retriever comprises:
moving the retriever from a first back end of the flat platform to a second front end of the flat platform via an actuator;
detecting contact between the retriever and the topmost object;
coupling the retriever to the topmost object; and
wherein retracting the retriever comprises pulling the topmost object unto the flat platform by moving the retriever coupled to the topmost object from the second front end of the flat platform to the first back end.

7. The method of claim 6, wherein said coupling comprises one or more of grasping the topmost object with the retriever, using suction to couple the retriever to the topmost object, or using a magnetic force to couple the retriever to the topmost object.

8. The method of claim 1, wherein the robot is a first robot, the method further comprising:
moving a second robot from a source location towards the pallet;
providing at least a first message from the second robot to the first robot in response to the second robot moving a first distance from the pallet; and
performing said identifying and aligning by the first robot in response to the providing of the first message from the second robot to the first robot.

9. The method of claim 8 further comprising:
providing at least a second message from the second robot to the first robot in response to the second robot moving to a closer second distance from the pallet; and
transferring the topmost object from the first robot to the second robot in response to the providing of the second message from the second robot to the first robot.

10. The method of claim 9, wherein transferring the topmost object from the first robot to the second robot comprises:
aligning a height of the flat platform of the first robot on which the topmost object is disposed with a height of a platform of the second robot; and
moving the topmost object from the platform of the first robot to the platform of the second robot based on one or more of actuating the retriever of the first robot or a retriever of the second robot.

11. An automated robotic depalletizing system comprising:
a first robot at a pallet comprising a stacked arrangement of a plurality of objects, the first robot comprising:
a wireless radio;
an actuated lift raising and lowering to a plurality of heights;
a platform providing a flat surface over and atop the actuated lift;
a sensor on said platform used to align said platform with a position of a topmost object on the pallet detected using the sensor; and
a retriever retrieving the topmost object by pulling and sliding the topmost object from the pallet onto said platform; and
one or more processors configured to:
raise the platform atop the actuated lift to a first height until a unique feature of the topmost object or empty space above the topmost object is detected by the sensor;
lower the platform from the first height to a lower second height until the sensor detects the platform becoming vertically aligned with a bottom of the topmost object;
extend the retriever across the platform until the retriever engages the topmost object; and
retract the retriever to slide the topmost object horizontally off the pallet and unto the platform after the retriever engages the topmost object,
a second robot transferring objects retrieved by the first robot to a plurality of storage locations, the second robot comprising:
a motorized base;
a platform; and
a wireless radio providing a first message to the wireless radio of the first robot when the second robot is a first distance from the pallet, and a second message to the wireless radio of the first robot when the second robot is a closer second distance from the pallet, wherein providing the first message directs the first robot in aligning said platform with the detected topmost object and retrieving the topmost object from the pallet, and wherein providing the second message directs the first robot in transferring the topmost object to the platform of the second robot.

12. The automated robotic depalletizing system of claim 11, wherein the second robot further comprises a retriever pushing the topmost object from the platform of the second robot to a particular storage location of the plurality of storage locations.

13. The automated robotic depalletizing system of claim 12, wherein the second robot further comprises a scanner associating a position of the topmost object to the particular storage location by scanning an identifier of the topmost object in conjunction with scanning an identifier of the particular storage location.

14. The automated robotic depalletizing system of claim 13, wherein the wireless radio of the second robot further transmits the identifier of the topmost object and the identifier of the particular storage location to an inventory management system that tracks locations of different objects to different locations of the plurality of storage locations.

15. The automated robotic depalletizing system of claim 11, wherein the first robot further comprises a scanner scanning an identifier associated with the pallet, wherein the wireless radio of the first robots provides the identifier to the wireless radio of the second robot, and wherein providing the identifier directs the second robot from an initial location to a location of the pallet.

16. The automated robotic depalletizing system of claim 11 further comprising a third robot arriving at the pallet after the second robot, and receiving a next topmost object from the first robot after the first robot transfers the topmost object to the second robot.

17. The automated robotic depalletizing system of claim 11, wherein the first robot further comprises a motorized base, and wherein the first robot aligns said platform with the position of the topmost object by:
centering left and right sides of the platform to left and rights sides of the topmost object based on movements of the motorized base.

18. A method comprising:
providing a robot comprising a moveable base, a sensor, an actuated lift, a platform providing a flat surface over and atop the lift, and a retriever on the platform;
detecting, via the sensor on the robot, a topmost object in a stacked arrangement of a plurality of objects, wherein detecting the topmost object comprises raising the platform via the lift to a first height until a unique feature of the topmost object or empty space above the topmost object is detected by the sensor;
adjusting a height of the platform to be parallel with a bottom of the topmost object based on readings of the sensor, wherein adjusting the height comprises lowering the platform from the first height to a lower second height until the sensor detects the platform becoming vertically aligned with the bottom of the topmost object;
aligning left and rights sides of the platform with left and right sides of the topmost object by adjusting a position of the robot to center the retriever relative to a center of the topmost object based on readings of the sensor; and
retrieving the topmost object from the stacked arrangement to the robot by pulling and sliding the topmost object off the stacked arrangement and onto the platform using the retriever.

19. The method of claim 18, wherein the robot is a first robot, the method further comprising scanning an identifier associated with the stacked arrangement, and transmitting the identifier to a second robot.

20. The method of claim 19 further comprising directing the second robot to location of the first robot and the stack arrangement in response to said transmitting.

* * * * *